US009237236B2

(12) United States Patent
Yang et al.

(10) Patent No.: US 9,237,236 B2
(45) Date of Patent: Jan. 12, 2016

(54) METHOD USING MOBILE-PHONE CLIENT SIDE TO PROVIDE VOICE OPTION AND TEXT PROMPT AND CORRESPONDING MOBILE-PHONE CLIENT SIDE

(71) Applicant: BEIJING NETQIN TECHNOLOGY CO., LTD., Beijing (CN)

(72) Inventors: Xiao Yang, Beijing (CN); Yuping Zhang, Beijing (CN); Yu Lin, Beijing (CN); Shihong Zou, Beijing (CN)

(73) Assignee: Beijing Netqin Technology Co., Ltd., Beijing (CN)

( * ) Notice: Subject to any disclaimer, the term of this patent is extended or adjusted under 35 U.S.C. 154(b) by 0 days.

(21) Appl. No.: 14/129,789

(22) PCT Filed: Nov. 14, 2012

(86) PCT No.: PCT/CN2012/084584
§ 371 (c)(1),
(2) Date: Dec. 27, 2013

(87) PCT Pub. No.: WO2013/071863
PCT Pub. Date: May 23, 2013

(65) Prior Publication Data
US 2014/0315523 A1 Oct. 23, 2014

(30) Foreign Application Priority Data
Nov. 15, 2011 (CN) .......................... 2011 1 0360778

(51) Int. Cl.
H04M 3/53 (2006.01)
H04M 1/57 (2006.01)
H04M 1/663 (2006.01)

(52) U.S. Cl.
CPC ............ H04M 3/5307 (2013.01); H04M 1/575 (2013.01); H04M 1/663 (2013.01); H04M 2250/60 (2013.01)

(58) Field of Classification Search
CPC . H04M 1/575; H04M 1/663; H04M 2250/60; H04M 3/5307
USPC ................ 455/412.1–412.2, 418–419, 550.1, 455/552.2, 563, 566; 379/88.13, 88.17, 379/88.18
See application file for complete search history.

(56) References Cited

U.S. PATENT DOCUMENTS 6,049,697 A * 4/2000 Scozzarella et al. ......... 340/7.31
6,163,606 A * 12/2000 Otto ......................... 379/211.02

(Continued)

FOREIGN PATENT DOCUMENTS

| CN | 101047901 A | 10/2007 |
| CN | 101079922 A | 11/2007 |
| CN | 101141724 A | 3/2008 |

OTHER PUBLICATIONS

International Search Report, dated Feb. 21, 2013, for corresponding International application No. PCT/CN2012/084584, 6 pages (Continued)

Primary Examiner — Babar Sarwar
(74) Attorney, Agent, or Firm — Seed IP Law Group PLLC

(57) ABSTRACT

The present disclosure provides a method for providing a voice prompt and a text prompt using a mobile phone client and a corresponding mobile phone client. The method uses software locally installed in the mobile phone to answer an incoming call automatically, provide a voice prompt including a plurality of options to the caller, and according to a selection of the caller, provide a user of the mobile phone with a text prompt corresponding to the selection from the caller. The present disclosure may advantageously achieve voice prompts and quick text feedbacks by using local software functions in the mobile phone, so that the user of the mobile phone can quickly learn intention of the caller.

8 Claims, 4 Drawing Sheets

(56) References Cited

U.S. PATENT DOCUMENTS

| | | |
|---|---|---|
| 6,671,370 B1 | 12/2003 | Heinonen et al. |
| 8,345,835 B1 * | 1/2013 | Or-Bach et al. ............ 379/88.23 |
| 2003/0103608 A1 * | 6/2003 | Pearson et al. ............ 379/88.18 |
| 2008/0247523 A1 | 10/2008 | Ying et al. |

OTHER PUBLICATIONS

Office Action from counterpart Chinese Patent Application No. 201110360778.X, mailed Jul. 31, 2015 (with English language translation)(11 pages).

* cited by examiner

| MANAGEMENT OF MISSED CALLS | | | |
|---|---|---|---|
| NUMBER | TIME | PROMPT | NUMBER OF TIMES |
| 1390XXXXXXX | 2011-4-1 9:41 | PLEASE CALL BACK IMMEDIATELY | 1 |
| 1370XXXXXXX | 2011-4-1 10:05 | PLEASE CALL BACK IN TWO DAYS | 1 |
| 1360XXXXXXX | 2011-4-1 10:26 | PLEASE CALL BACK LATER | 1 |
| 1361XXXXXXX | 2011-4-1 15:41 | NOT SELECT | 2 |
| OPTION | | | RETURN |

METHOD USING MOBILE-PHONE CLIENT SIDE TO PROVIDE VOICE OPTION AND TEXT PROMPT AND CORRESPONDING MOBILE-PHONE CLIENT SIDE

TECHNICAL FIELD

The present disclosure relates to mobile communication field, and particularly, to a method for providing a voice option and a text prompt using a mobile phone client and a corresponding mobile phone client.

BACKGROUND

Currently, with development of smart mobile phones, there are many ways for a mobile phone to handle an incoming call, such as interception or filtering an incoming call. Personalized options for the mobile phone provide more humanized handlings to users. For example, the mobile phone may be set to refuse any incoming call when its user is asleep, has a meeting, or drives.

Generally, a function of interception or filtering an annoying call can prompt a user that an incoming call is an annoying call. However, if a personalized setting for refusing an incoming call has been set up by the user, a rejection record merely shows numbers and times of refused calls.

Similarly, if the mobile phone is set to refuse any incoming call when a user is asleep, the user may see prompts of showing numbers and times of refused calls only. Nevertheless, the user cannot know intention and content of the missed calls. If there are a plurality of missed calls, the user cannot distinguish importance levels and priorities of these calls.

There are voice mailbox services in prior art, such as a pay voice mailbox service operated by a telecommunication operator. However, the function of the voice mailbox is implemented by recording voice information at a server of the telecommunication operator and prompting a user of a mobile phone via a short message or the like. A prompt received by the user of the mobile phone may include a number of an incoming call dialing the voice mailbox and a time length of recorded voice information, etc. The prompt does not include an importance level or a priority of voice information. If the user of the mobile phone receives multiple pieces of voice information, the user of the mobile phone has to dial a dedicated number for the voice mailbox of the telecommunication operator and listens to the multiple pieces of voice information one by one, so as to learn the importance level or priority of the voice information.

Accordingly, a solution in which importance levels of missed calls can be distinguished by a user and it is not needed for the user to spend a lot of time to dial the missed calls or listen to voice mails one by one.

SUMMARY OF THE INVENTION

In order to solve the problems in prior art, the present disclosure provides a method for providing a voice option and a text prompt using a mobile phone client. The method comprises answering an incoming call automatically, providing a voice prompt and a corresponding keystroke option to a caller, receiving a record of keystroke option from the caller, converting the record of keystroke option into a corresponding text prompt, and presenting the text prompt to a user of the mobile phone.

Compared with methods for recording voice mails or prompting missed calls in prior art, the present disclosure enables a user to distinguish importance levels of missed calls, without spending a lot of time to dial the missed calls or listen to voice mails one by one.

BRIEF DESCRIPTION OF THE DRAWINGS

Other features and advantages of the method according to the present disclosure will be embodied or stated in the following drawings and the following detailed description about the present invention. The specific principles of the present disclosure are explained by the drawings and the detailed description of the present disclosure.

DETAILED DESCRIPTION

Figure 1:
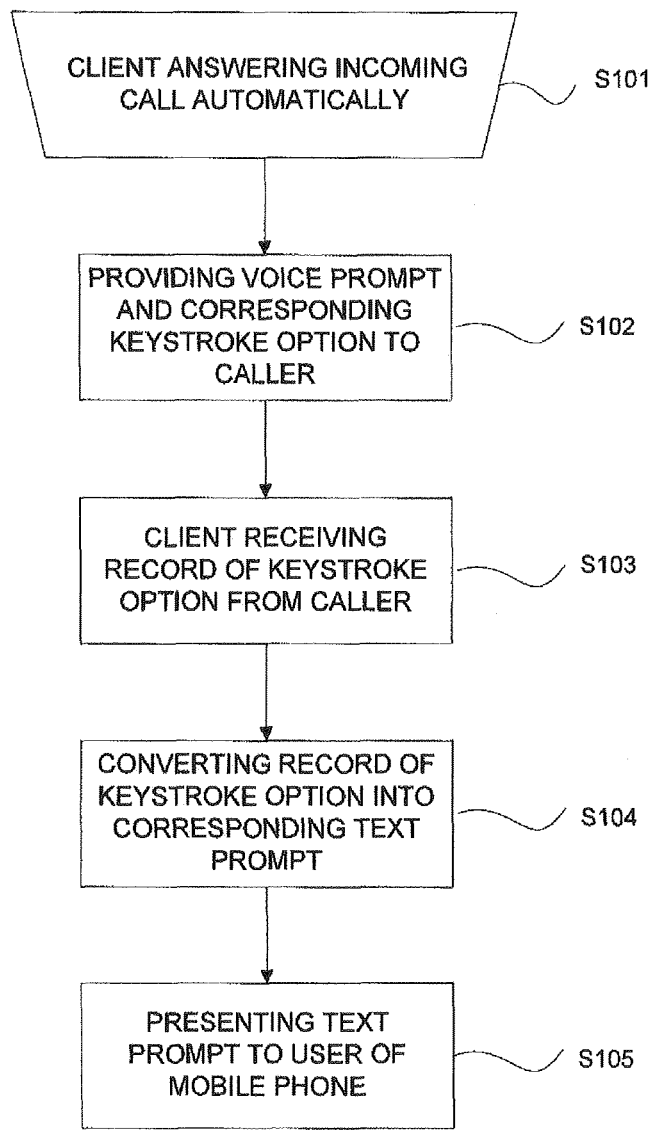
FIG. 1 is a flowchart of a method according to an embodiment of the present disclosure.

Various embodiments of the present disclosure are described in detail below. Examples of the embodiments are illustrated in the drawings and following description. Although the present disclosure is described in conjunction with exemplary embodiments, it will be appreciated that the present disclosure is not limited thereto. To the contrary, the present disclosure intends to cover not only the exemplary embodiments, but also other alternatives, modifications, equivalents, and embodiments of essentials and scopes of the present disclosure as defined by appended claims.

The present disclosure provides a method for providing a voice option and a text prompt using a mobile phone client. Embodiments will be described in detail in conjunction with a Symbian operating system. One of ordinary skill in the art can appreciate that solutions of the present disclosure are not limited to the Symbian operating system and can also be applied on the basis of other operating systems. According to an embodiment of the present disclosure, as shown in FIG. 1, the method for providing a voice option and a text prompt using a mobile phone client starts with step S101 at which the client answers an incoming call automatically. Alternatively, the client is a functional module installed on an operating system of a mobile phone. Taking the Symbian operating system as an example, an event of an incoming call is needed to be monitored firstly. The iTelephony interface may be used to monitor a state change:
NotifyChange (iStatus, CTelephony::EVoiceLineStatusChange,iCallStatusPkg); SetActive( ). Once a voice incoming call occurs, the iTelephony interface is used to activate answering: AnswerIncomingCall (iStatus,iCallId); SetActive( ).

At step S102, a voice prompt and a corresponding keystroke option is provided to the caller. The provided voice prompt includes, by default, a reason for entering the voice prompt, such as "the owner of the mobile phone is not available for answering the call at present." The voice prompt may also include an explanation of operating the keystroke option, such as "please enter a corresponding option after listening to following prompts and press # to confirm." The voice prompt may also include an explanation of the keystroke option, such as "emergency, call back immediately, please press 1," "emergency, call back later, please press 2," "call back by tomorrow, please press 3," or "no need for call back, please press 4." These recordings are stored in an internal or external storage of the mobile phone. When the incoming call is answered automatically, a related recording will be played. Taking the Symbian operating system as an example, a piece of voice to be played is selected by using a function of iAudioPlayer→OpenFile(_L("audiofilename")) firstly, and then is played using iAudioPlayer→Play( ).

At step S103, the client receives a record of keystroke option from the caller. According to an embodiment of the present disclosure, a keystroke signal is converted to a double tone signal through use of Double Tone Multiple Frequency (DTMF) signaling and is transmitted. The client restores the signal to a keystroke option. Taking the Symbian operating system as an example, the client firstly receives a double tone signal in the form of a character string, acquires data of the character string (TRequestStatus iStatus;TBuf<8> iDtmfBuf;TInt iDtmfNum) of the double tone signal by using a function (RMobilePhone iDtmfPhone), reads the data of the character string and converts it into a numerical value (iDtmfPhone.ReadDTMFTones(iStatus, iDtmfBuf); TLex lex (iDtmfBuf); lex.Val(iDtmfNum)).

At step S104, the record of keystroke option is converted into a corresponding text prompt. According to an embodiment of the present disclosure, the client finds, after identifying the double tone signal, a corresponding preset text prompt according to the identified double tone signal, such as "emergency, call back immediately," "emergency, call back later," "call back by tomorrow," or "no need for call back." The preset text prompt is stored in an internal or external storage of the mobile phone and corresponds to a keystroke signal. The preset text prompt can be edited by the user of the mobile phone and is not limited to the above examples. Text prompts defined by any user can be applied. For example, "priority-important" corresponds to a keystroke signal 1, "priority-general" corresponds to a keystroke signal 2, and "priority-not important" corresponds to a keystroke signal 3. If, after the call is answered automatically, the caller hangs up without entering any option, "the caller does not select" will be prompted.

Figures 3, 4:
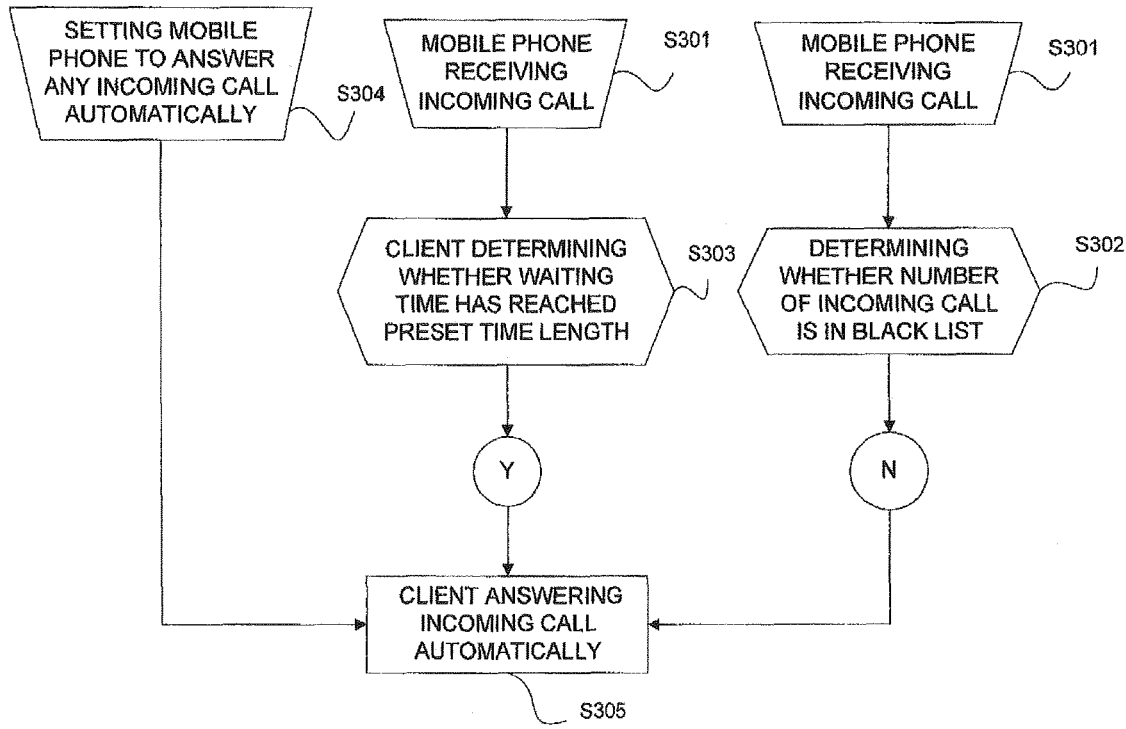
FIG. 3 is a flowchart of starting automatically answering according to an embodiment of the present disclosure.
FIG. 4 is a schematic diagram of recording prompts of missed calls according to an embodiment of the present disclosure.

At step S105, the text prompt is presented to the user of the mobile phone. According to an embodiment of the present disclosure, the text prompt includes numbers and times of missed calls as well as the preset text prompt found in the step S104. Alternatively, the presented text prompt is used to present information on incoming calls, which have been automatically answered within a preset time period, in a form of a statement to the user of the mobile phone. As shown in FIG. 4, numbers of the missed calls are listed in the left column, and dates and times of the missed calls, prompt options selected by the callers, and the number of times of the missed calls are listed to the right one by one.

Figure 2:
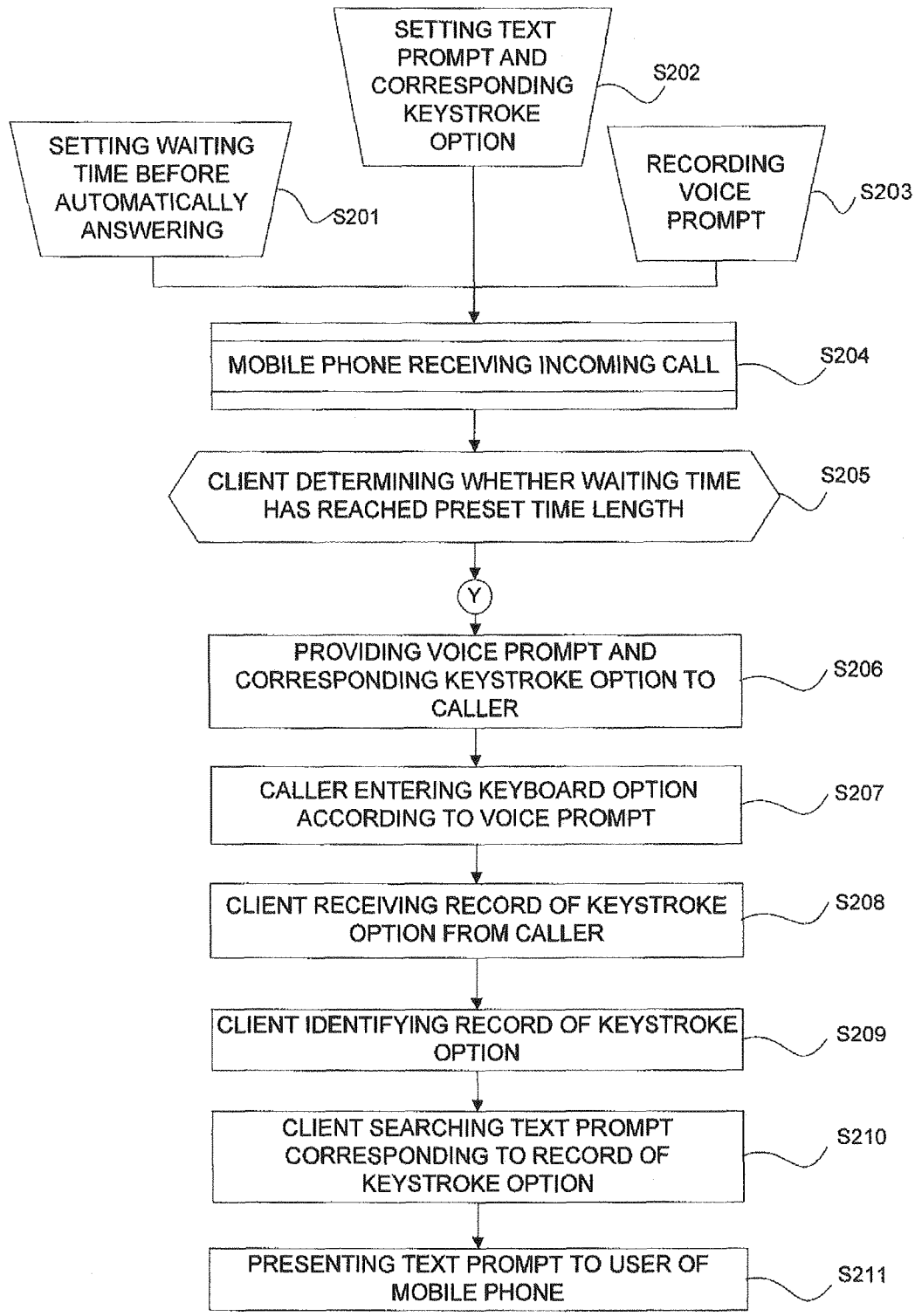
FIG. 2 is a flowchart of a method according to another embodiment of the present disclosure.

According to an embodiment of the present disclosure, as shown in FIG. 2, the method for providing a voice option and a text prompt using a mobile phone client starts with steps S201-S203, i.e., setting automatically answering and voice mails. At step S201, a waiting time before automatically answering the incoming call is set, such as 1 second, two seconds, or three seconds. At step S202, a text prompt and a corresponding keystroke option are set. For example, "priority-important" corresponds to a keystroke signal 1, "priority-general" corresponds to a keystroke signal 2, and "priority-not important" corresponds to a keystroke signal 3. If, after an incoming call is answered automatically, the caller hangs up without entering any option, "the caller does not select" will be prompted. At step S203, a voice prompt is recorded such as "I cannot answer your call at present, please listen to following options and enter your selection . . . "

At step S204, the mobile phone receives the incoming call. At step S205, the client determines whether the waiting time has reached a preset time length. If so, a voice prompt and a corresponding keystroke option are provided to the caller at step S206. At step S207, the caller enters a keyboard option according to the voice prompt. For example, if the caller considers his/her call as very important, he/she may enter a keyboard option "1." At step S208, the client receives a record of keystroke option from the caller. At step S209, the client identifies the record of keystroke option. At step S210, the client finds a text prompt corresponding to the record of keystroke option. For example, the keyboard option "1" corresponds to a text prompt of "priority-important." At step S211, the text prompt is presented to the user of the mobile phone.

According to an embodiment of the present disclosure, as shown in FIG. 3, the method for providing a voice option and a text prompt using a mobile phone client starts with step S301 at which a mobile device receives an incoming call. At step S302, it is determined whether a number of the incoming call is in a black list. The black list includes telephone numbers which are often annoying or related to promote sales. The black list may be a telephone number list stored on the client and may be updated in real time by connecting to a server through a network. The black list may also be a telephone number database stored at the server. When the user needs to check the number of the incoming call, characters of the telephone number is transmitted through a network connection to the server for check. If the number of the incoming call is not in the black list, the client answers the incoming call automatically at step S305.

According to an embodiment of the present disclosure, at step S303, the client determines whether a waiting time has reached a preset time length, which is set at the client. If so, the client answers the incoming call automatically at step S305.

According to an embodiment of the present disclosure, at step S304, the mobile phone is set to answer any incoming call automatically.

FIG. 4 shows a record of prompts of missed calls according to an embodiment of the present disclosure. As shown in FIG. 4, numbers of missed calls are listed in the left column, and dates and times of the missed calls, prompt options selected by the callers, and the number of times of the missed calls are listed to the right one by one.

Figure 5:
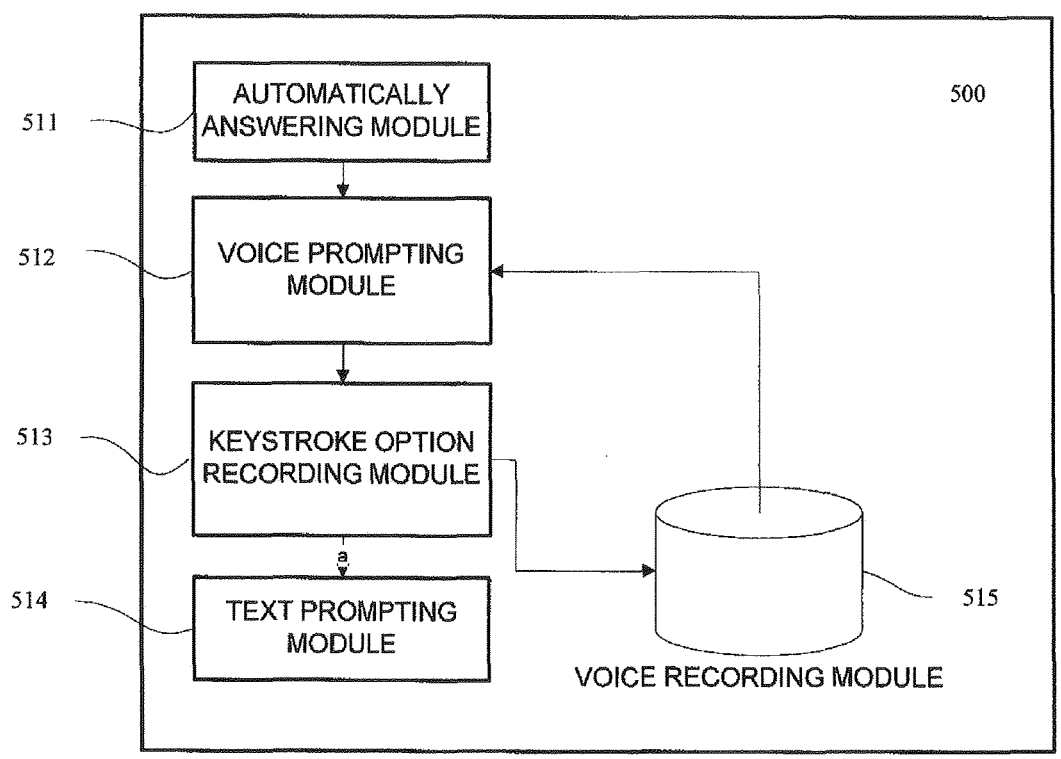
FIG. 5 is a block diagram of a mobile phone client according to an embodiment of the present disclosure.

FIG. 5 is a schematic diagram of a mobile phone client 500 for providing a voice option and a text prompt according to an embodiment of the present disclosure. As shown in FIG. 5, the mobile phone client 500 comprises an automatically answering module 511, a voice prompting module 512, a keystroke option recording module 513, and a text prompting module 514. Alternatively, the mobile phone client 500 may further comprise a voice recording module 515. The automatically answering module 511 communicates with an operating system of the mobile phone and answers an incoming call automatically. The automatically answering module may also start automatically answering according to a waiting time set by the user, or answer any incoming call automatically according to a user setting. The voice prompting module 512 communicates with the automatically answering module 511 and the voice recording module 515. After the incoming call is answered automatically, the voice prompting module 512 reads a recording stored in the voice recording module 515, and plays the recording to the caller. The keystroke option recording module 513 communicates with the operating system of the mobile phone, receives and records a record of keystroke option from the caller, and converts the keystroke option into a numerical value. The text prompting module 514 communicates with the keystroke option recording module 513, reads the numerical value corresponding to the keystroke option from the caller, and presents a corresponding prompt to the user of the mobile phone. The voice recording module 515 may store recordings of voice prompts preset by the user. The voice recording module 515 may be activated according to the numerical value corresponding to the keystroke option to record voice of the caller. In addition, the voice recording module 515 may also store a list of text prompts corresponding to keystroke options.

The foregoing descriptions present the specific exemplary embodiments of the present disclosure for purpose of illustration. These exemplary embodiments are not exhaustive or intended to limit the present disclosure to the disclosed exact forms. Apparently, various modifications and variations according to the above teachings are applicable. These exemplary embodiments are selected and described in order to explain the specific principles of the present invention and its practice applications, so that one of ordinary skill in the art may manufacture and use respective exemplary embodiments of the present invention as well as various alternatives and modifications. In fact, the scope of the present disclosure should be defined by the appended claims and their equivalents.

What is claimed is:

1. A method for providing a voice option and a text prompt using a mobile phone client, comprising:
   a) answering an incoming call automatically;
   b) providing a voice prompt and a corresponding keystroke option to a caller;
   c) providing a voice mail option to the caller through a keystroke option;
   d) receiving a record of the corresponding keystroke option from the caller;
   e) converting the record of keystroke option into a corresponding text prompt;
   f) presenting the corresponding text prompt to a user of the mobile phone;
   g) after the caller selects the voice mail option, the mobile phone client begins to record voice.

2. The method according to claim 1, further comprising: before the step of a), the mobile phone client answering automatically if the user of the mobile phone does not operate in a predetermined time period.

3. The method according to claim 1, further comprising: configuring the mobile phone to answer incoming call automatically.

4. The method according to claim 1, wherein the voice prompt is updated by the user of the mobile phone.

5. The method according to claim 1, wherein the keystroke option corresponding to the text prompt and the corresponding text prompt are set and updated by the user of the mobile phone.

6. The method according to claim 1, further comprising: the steps of a)-b) and d)-f) being applied, partly applied, or not applied by the user for contacts in telephone directory.

7. A non-transitory processor-readable storage medium storing processor-executable instructions that, when executed by a processor of a mobile phone cause the mobile phone to:
   communicate with an operating system of the mobile phone and answer an incoming call automatically;
   provide a recording of a voice prompt to and corresponding keystroke option to a caller when the incoming call is answered automatically;
   provide a voice mail option to the caller through a keystroke option;
   communicate with the operating system of the mobile phone and receive and record a record of keystroke option corresponding to the voice prompt from the caller;
   convert the record of keystroke option into a corresponding text prompt;
   present the corresponding text prompt to a user of the mobile phone; and
   record voice after the caller selects the voice mail option.

8. The non-transitory processor-readable storage medium according to claim 7, wherein the processor-executable instructions that, when executed by the processor of a mobile phone, cause the mobile phone to answer the incoming call automatically, if the user of the mobile phone does not answer the incoming call in predetermined time period.

* * * * *